United States Patent [19]

Gute

[11] 4,452,436
[45] Jun. 5, 1984

[54] SINGLE TUBE STRUT SHOCK ABSORBER

[75] Inventor: Loren R. Gute, Dayton, Ohio

[73] Assignee: General Motors Corporation, Detroit, Mich.

[21] Appl. No.: 288,524

[22] Filed: Jul. 29, 1981

[51] Int. Cl.$^3$ ............................................. F16F 9/348
[52] U.S. Cl. ................................ 267/64.15; 267/64.16; 188/282; 188/317; 188/322.15; 138/43; 138/45; 138/46
[58] Field of Search ............... 188/282, 289, 317, 320, 188/322.15, 322.22, 275, 281; 267/8 R, 64.15, 64.16, 64.17, 64.18, 64.22, 64.26, 120, 140.1, 140.2, 64.28; 138/42, 43, 44, 45, 46; 239/533.13, 533.14

[56] References Cited

U.S. PATENT DOCUMENTS

| | | | |
|---|---|---|---|
| 2,182,581 | 12/1939 | Casper | 267/8 R |
| 2,320,697 | 6/1943 | Binder | 188/322.15 |
| 2,684,081 | 7/1954 | Chace | 138/45 |
| 2,819,064 | 1/1958 | Peras | 267/64.16 |
| 3,199,636 | 8/1965 | de Carbon | 188/322.15 |
| 3,409,050 | 11/1968 | Weese | 138/45 |
| 3,430,977 | 3/1969 | Riehl | 267/64.16 |
| 3,747,913 | 7/1973 | Savery | 267/64.28 |
| 3,874,486 | 4/1975 | Katsumori et al. | 188/282 |
| 3,993,294 | 11/1976 | Wössner et al. | 267/64.26 |
| 4,096,928 | 6/1978 | Krafzig et al. | 188/282 |
| 4,256,292 | 3/1981 | Sullivan, Jr. et al. | 267/8 R |

FOREIGN PATENT DOCUMENTS

| | | | |
|---|---|---|---|
| 2245590 | 3/1974 | Fed. Rep. of Germany | 267/64.15 |
| 2645501 | 4/1977 | Fed. Rep. of Germany | 188/317 |
| 682110 | 11/1952 | United Kingdom | 267/64.26 |
| 1235536 | 6/1971 | United Kingdom | 188/317 |

Primary Examiner—Douglas C. Butler
Assistant Examiner—R. R. Diefendorf
Attorney, Agent, or Firm—Charles R. White

[57] ABSTRACT

Single tube vehicle suspension strut with built-in shock absorber in which the piston rod is formed from tubing that provides a reservoir for shock absorber fluids and further featuring this type piston valving with the deflecting spring discs and cooperating metering pin construction which can readily reduce high pressure build-up and which can be adjusted to provide ride and level control. This unit can be used to provide a leveling feature with the gas spring in the piston tube operatively connected to suitable controls for pressurized gas and exhaust.

5 Claims, 4 Drawing Figures

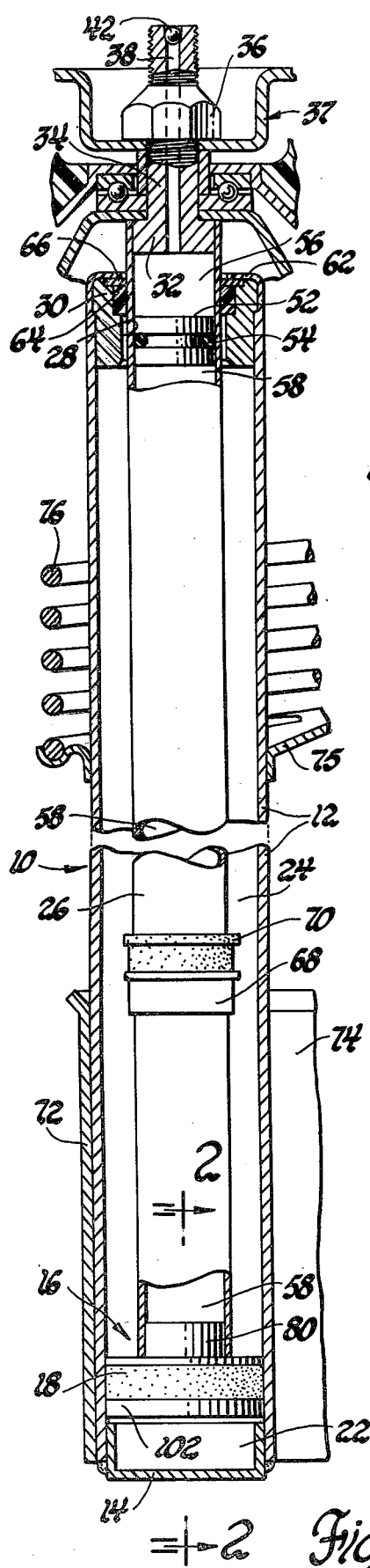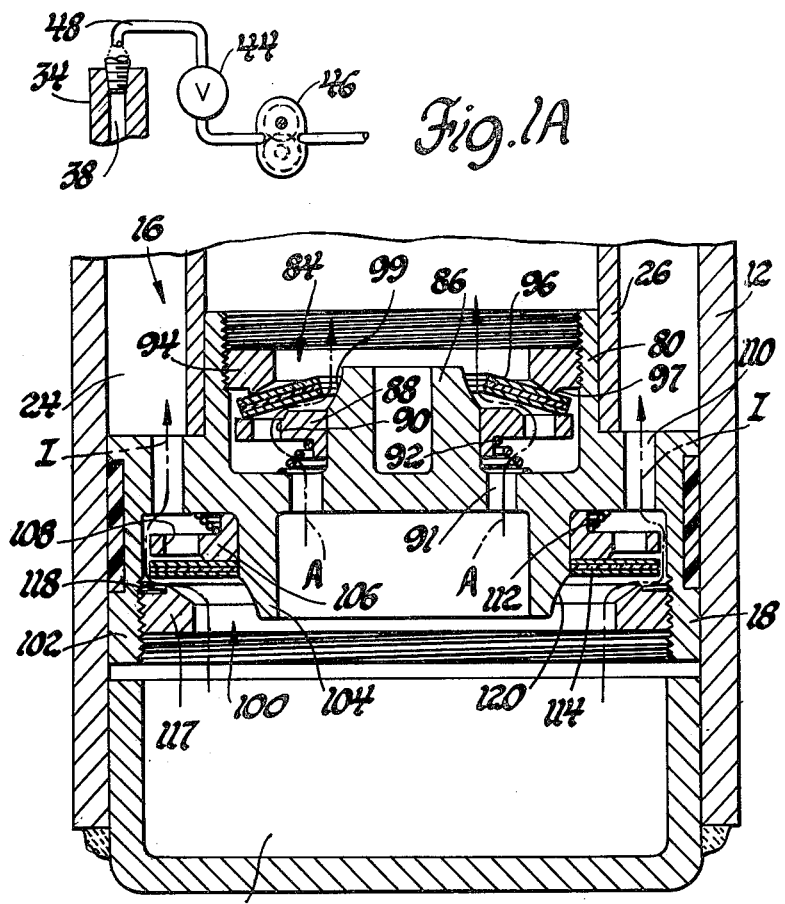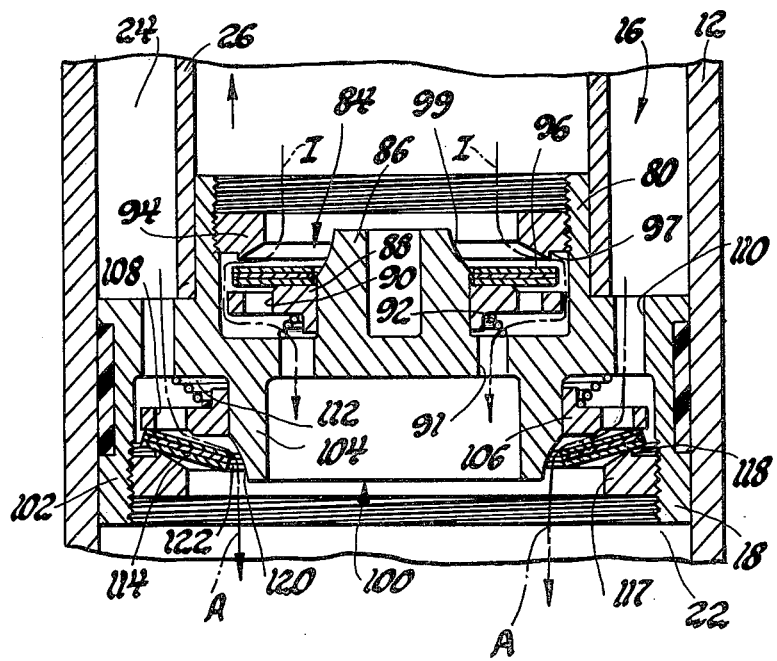

SINGLE TUBE STRUT SHOCK ABSORBER

This invention relates to shock absorber suspension struts for vehicles and more particularly to a new and improved single tube strut shock absorber featuring deflecting disc piston valving and a hydraulic fluid reservoir within a hollow tubular piston rod to provide a compact and lightweight unit with precise control of vehicle ride and handling characteristics.

Prior to the present invention, vehicle suspension struts incorporated hydraulic shock absorber units for damping the action of suspension spring to control vehicle ride and to provide improved vehicle control. Such struts are often multi-tube units which are bulky, complex in construction, and which materially add to vehicle weight. In contrast to many prior art units, this invention provides a new and improved lightweight shock absorber strut which has single tube construction with elimination of the conventional reservoir tube and with new and improved valving in the piston hydraulically interconnecting the working chambers of the unit and a hydraulic reservoir within a tubular piston rod for accommodating shock absorber fluid on compression stroke. A gas piston in the hollow piston rod tube separates the interior thereof into a gas spring and hydraulic fluid reservoir. This piston prevents the intermixture of gas and oil in the reservoir within the gas piston rod tube. The spring provides an axial force on the reservoir fluid to prevent lag and thereby improve valve operation. Vehicle leveling assist is provided by varying pressure of the gas spring to accommodate varying load conditions.

It is a feature, object and advantage of this invention to provide a new and improved single tube strut shock absorber for vehicle suspension in which the shock absorber is integral with the strut and which has internal reservoir within the tubular piston rod of the shock absorber which provides for a small size and reduced weight with improved performance and to further provide a leveling capability to assist the spring suspension.

It is another feature, object and advantage of this invention to provide a new and improved single tube strut type shock absorber which incorporates a piston that reciprocally moves through a body of shock absorber fluid and which has a cylindrical piston rod tube providing an internal chamber forming a reservoir for shock absorber fluid which reservoir is interconnected with the working chambers in the shock absorber by new and improved piston valving.

Another feature, object and advantage of this invention is to provide a new and improved piston valving in a shock absorber in which metering pin construction in the piston cooperates with deflected disc spring valve members to form a variable orifice which increases with deflection of the spring disc to optimize pressure/flow relationship in the unit and to reduce the build-up of high pressures within the unit on both compression and rebound stroke.

These and other features, objects and advantages of this invention will be more apparent from the following detailed description and drawings in which:

FIG. 1 is an elevational view partly in cross-section of a single tube strut and shock absorber incorporating the essentials of this invention;

FIG. 1A is a diagrammatical view of an upper portion of the single tube strut and shock absorber unit of FIG. 1 illustrating a second embodiment of this invention;

FIG. 2 is a view taken along lines 2—2 of FIG. 1 as viewed in the direction of the indicator arrows and showing the unit in the compression mode of operation; and FIG. 3 is a view similar to FIG. 2 showing the unit of FIG. 1 in the rebound mode of operation.

Turning now in greater detail to the drawing there is shown in FIG. 1 a unitized suspension strut and shock absorber assembly 10 for a vehicle which has an elongated outer cylindrical tube 12 closed at its lower end by an end cap 14. Mounted for reciprocal movement within tube 12 is a piston and piston tube assembly 16. This assembly comprises a generally cylindrical valved piston 18 which slidably fits the inner wall of the outer tube 12 to hydraulically separate the tube into two expansible and contractable working chambers 22 and 24. An elongated piston tube 26 is securely connected at its inner end to the piston 18 and extends upwardly therefrom through the outer tube 12 and a central bore 28 in a piston tube guide and bushing assembly 30. The piston tube 26 being formed into an elongated cylinder from sheet material provides an internal chamber closed by the head 32 of an upwardly extending strut mounting stud 34 welded in the outer end of the piston tube. The outer end of stud 34 is threaded to receive a nut 36 for attachment of the piston tube 26 to a strut mount assembly 37 secured to the vehicle body. The stud is formed with a centralized gas passage 38 to permit the injection of a gas charge into the interior of the piston tube to provide a gas spring for the hydraulic fluid reservoir also provided therein. After the injection of a predetermined quantity of air or other gas into the piston tube, the passage may be sealed by a steel ball 42 welded into the entrace of the passage. In the event that gas is to be used as a load leveling spring, passage 38 is pneumatically connected to a height control valve 44 and compressor 46 by line 48 as diagrammatically illustrated in FIG. 1A. With this arrangement, the height control valve senses change in curb height from vehicle loading or unloading and accordingly activates the compressor 46 or opens an exhaust port to increase or decrease the level of the vehicle.

The gas spring is provided above a sheet metal piston 52 having an O ring seal 54 slidably mounted within the piston tube 26 to separate the interior of the piston tube into variable volume gas chamber 56 and hydraulic fluid reservoir 58. The gas in chamber 56 acts on the piston 52 which in turn acts on the hydraulic fluid in the reservoir for the hydraulic shock absorber fluid of the unit.

The piston tube guide and bushing assembly 30 seats on an internal shoulder formed in the outer tube 12 and is trapped on the shoulder by formed over end 62 of the tube. The piston tube 26 is slidably mounted through the piston tube guide and bushing assembly 30 that is formed with a counter bore to receive a suitable fluid seal 64 retained in position by a washer 66 located under the turned over end 62 of the outer tube.

Welded to the piston tube 26 toward the lower end thereof is a sleeve-like rebound stop 68 on which an elastomeric rebound bumper 70 is supported. This bumper on contact with the lower end of the piston tube guide and bushing assembly 30 deflects to cushion rebound stroke of the assembly 10.

The lower end of the strut is secured within a bracket 72 connected to the steering knuckle on the road wheel assembly or other unsprung portion 74 of the vehicle. Attached to the tube 12 at a given distance above the bracket is a spring seat 75 on which the vehicle suspension spring 76 is mounted. The upper end of this spring is operatively mounted on the underside of an upper spring seat not shown operatively connected to strut mount assembly. Such construction is illustrated in U.S. Pat. No. 4,256,292 issued Mar. 17, 1981 hereby incorporated by reference.

FIGS. 2 and 3 show details of the valving in the piston 18 under compression and rebound operating conditions. These valves comprise a unique deflectable valve disc arrangement in combination with a metered orifice for flow control of the hydraulic fluid transiting between the chambers in the shock absorber which varies in accordance with the amount of valve disc deflection. In the preferred construction, the piston 18 is formed with an internal threaded cylindrical extension 80 that extends upwardly from the main body of the piston and which fits within and is secured to the lower end of the piston tube 26. The cylindrical extension 80 provides an internal recess for compression stroke valving 84 hereinafter described. Radially inward of the extension 80, the piston has a centralized and upwardly extending generally cylindrical metering pin 86 on which a washer-like valve element 88 is mounted for axial sliding movement. This valve element has fluid passages 90 in the outer periphery which in combination with passages 91 in the piston provides for the passage of hydraulic fluid therethrough under certain operating conditions described below. A helical spring 92 seated on the upper face of the piston and underneath the valve element provides a light spring force urging the valve element 88 upwardly. Operatively mounted between the valve element 88 and an adjustment nut 94 threaded into the extension 80 is a spring disc pack 96, comprising a plurality of thin coned springs which control the flow through the piston from the compression chamber to the reservoir 58 in the piston tube on the compression stroke. As shown, the nut 94 has an annular ridge 97 which contacts the spring pack adjacent to the outer edge of the upper spring. By advancing the nut inwardly or outwardly from the illustrated position, the cone angle of the spring pack is accordingly reduced or increased to thereby change the rate of the spring pack so that the valve can be set to tailor the damping of suspension spring action for various road conditions. Suitable openings or surfaces are provided for the nut 94 so that appropriate tooling can be used for axial adjustment of the nut.

The metering pin 86 is formed with an annular concave cam surface 99 which increases in diameter from the upper end of the metering pin to the termination of the cam surface. This cam surface cooperates with the inner peripheral edge of the spring disc pack to provide an orifice which increases on compression stroke for improved tailoring of flow through the valving to provide more precise control for selective vehicle weights and dynamics of particular vehicles.

The rebound control valving 100 is similar in construction and operation to the compression control valving 84. As shown in FIGS. 2 and 3, the piston includes a second internally threaded cylindrical extension 102 which, in contrast to extension 80, projects downwardly. The rebound control valving contains a centralized and downwardly projecting metering pin 104 on which annular valve element 106 is mounted for limited axial sliding movement. The flange of this valve element is provided with axial openings 108 for allowing fluid to flow therethrough from chamber 24 via axial passages 110 in the piston. The helical spring 112 seated on the lower face of the piston urges the valve element downwardly. A pack 114 of spring discs is operatively mounted between the valve element 106 and an adjusting nut 117 threaded into extension 102. The nut has an annular contact ridge 118 engaging the outer periphery of the lowermost spring disc so that the rate of the spring pack 114 can be adjusted to provide appropriate damping of the suspension spring in accordance with road requirements.

During compression stroke shown in FIG. 2, there is downward motion of the piston and fluid is forced from the chamber 22 through the orifice provided by the spring disc pack 96 in the center of the piston and the cam surface 99 of the metering pin 86 into the hydraulic fluid reservoir 58 in the hollow rod. As the spring discs deflect upwardly, their inner diameters will form a variable opening with the cam surface of the metering pin. This opening will vary with the shape of the cam surface and the amount of deflection of the discs. During compression stroke, the rebound control valving 100 will be moved to the FIG. 2 position by the fluid flowing from chamber 22 into chamber 24 against the low force of spring 112 with little or no inner action with the compression valve setting. This flow is illustrated by inactive flow arrows I. The fluid displaced by the piston and piston rod as it travels inwardly into the tube 12 flows into the reservoir 58 provided within the piston tube as shown by active flow arrows A. The fluid entering the reservoir forces the gas piston 52 upwardly and works against the compressible gas in the gas chamber formed within the piston tube without lag or loss of control. In this design the working chamber 24 is completely filled with hydraulic fluid which is relatively incompressible and which provides for fast response to vehicle damping requirements. Thus, with the strut mounted to the vehicle with the piston attached at the threaded end to the vehicle body and with the outer cylinder attached by the bracket to the wheel steering knuckle, a damping and load leveling is provided between the wheel which follows the contours of the road surface and the vehicle body.

During rebound stroke, there is an upward motion of the piston and the rebound spring valve disc pack 114 deflects and cooperates with the concave and annular cam surface 120 of the metering pin 104 to provide a variable control orifice 122 which increases with the amount of deflection of the valve discs. An axial adjustment is provided by the nut 117 in a manner similar to that with the compression stroke valving. With this construction there is a minimum of inner action from the compression valving since a very light spring force is used to keep it closed. The active and inactive fluid flow through the piston valving is again illustrated by low arrows A and I. During rebound motions, the piston exits from the cylinder tube. As this happens, the hydraulic fluid is displaced from the hydraulic piston by the force of the gas spring. The gas piston keeps the air or gas from mixing with the fluid that might otherwise cause lag with deterioration from performance of the strut.

In the event that leveling assistance is desired, the construction of FIG. 1A is employed to introduce additional quantities or gas into the chamber 56 or to exhaust quantities of gas from this chamber. If the height control valve senses overloading, additional charges of gas are pumped into the chamber 56 from the compressor 46 so that gas spring pressure is increased and more load can be supported by the piston to maintain vehicle height. If the vehicle is unloaded, the height control valve will exhaust gas from the gas spring until level height is obtained.

While a preferred embodiment of the invention has been shown and described, other modifications will become apparent to those skilled in the art. Accordingly, the scope of this invention is set forth in the following claims.

The embodiments of the invention in which an exclusive property or privilege is claimed are defined as follows:

1. A telescopic hydraulic shock absorber comprising a cylinder tube having a hydraulic fluid therein, a primary piston mounted for reciprocating axial movement in said cylinder tube and cooperating with said cylinder tube for forming first and second chambers filled with hydraulic fluid, said primary piston having first variable orifice valve means therein hydraulically interconnecting and metering flow of fluid directly through said primary piston between said first and second chambers only as the primary piston axially moves in a rebound stroke in said tube, a tubular piston rod operatively secured to said primary piston and axially extending in said cylinder tube and outwardly from one end thereof, a floating piston mounted in said tubular piston rod for forming variable volume third and fourth fluid chambers, said third chamber providing a hydraulic fluid reservoir, second variable orifice valve means in said primary piston operatively in parallel with said first valve means hydraulically interconnecting and metering flow directly through said primary piston from said first fluid chamber to said third fluid chamber in said piston rod only when the primary piston moves axially in said cylinder tube in a compression stroke, a compressible gas operatively disposed within said fourth chamber to provide a spring active on said floating piston therein with sufficient pressure to keep the hydraulic fluid in said third chamber in intimate contact with said second valve means during all axial movements of said primary piston to reduce shock absorber lag and thereby improve damping performance of said shock absorber.

2. The shock absorber defined in claim 1 wherein said piston has a first metering pin extending into said first chamber and a second metering pin extending into said third chamber in said piston rod, first deflectable disc means associated with said first metering pin and second deflectable disc means associated with said second metering pin to respectively provide said first and second variable orifice valve means of said shock absorber.

3. A telescopic hydraulic shock absorber and suspension strut unit comprising an outer cylindrical tube having a hydraulic fluid therein, a primary piston mounted for reciprocating axial movement in said outer tube and cooperating therewith to form first and second chambers filled with hydraulic fluid, said primary piston having first variable orifice valve means therein actively metering fluid flow directly through said primary piston between said first and second chambers as the primary piston axially moves in said tube in rebound stroke, a tubular piston rod operatively secured to said primary piston and axially extending in said outer tube through one end thereof, a piston rod guide mounted in said last mentioned end of said outer tube slidably receiving said piston rod, annular fluid seal means supported in said rod guide and disposed around said piston rod to hydraulically seal said cylinder tube, a floating piston mounted in said tubular piston rod for forming variable volume third and fourth fluid chambers, said third chamber providing a hydraulic fluid reservoir for at least some of the fluid in said cylinder tube, second variable orifice valve means in said primary piston and in parallel with said first valve means active to meter fluid flow directly through said primary piston from said first fluid chamber to said third fluid chamber in said piston rod in response to telescopic movement of said primary piston and piston rod into said cylindrical outer tube on the compression stroke, a compressible gas operatively disposed within said fourth chamber to provide a spring medium active on said floating piston therein with sufficient force to keep the hydraulic fluid in said third chamber in intimate contact with said valve means of said primary piston during telescopic movement of said primary piston to reduce shock absorber lag and thereby improve damping performance of said shock absorber.

4. A telescopic hydraulic shock absorber strut for a vehicle comprising a cylinder tube supporting a suspension spring and having a hydraulic fluid therein, a primary piston mounted for reciprocating axial movement in said cylinder tube and separating said cylinder tube into first and second variable volume chambers filled with hydraulic fluid, said primary piston having first variable orifice valve means therein hydraulically metering fluid flow from said first to said second chambers as the primary piston axially moves outwardly with respect to said cylinder tube in the rebound stroke, a hollow tubular piston rod operatively secured to said primary piston and axially extending in said cylinder tube and outwardly from one end thereof, a floating piston mounted in said piston rod for forming variable volume third and fourth fluid chambers, said third chamber providing a hydraulic fluid reservoir, second variable orifice valve means in parallel with said first valve means supported concentrically with respect to said first valve means by said primary piston and hydraulically connecting said first fluid chamber to said third chamber in said piston rod for metering flow therebetween only when said primary piston moves inwardly with respect to said cylinder tube on the compression stroke, a compressible gas operatively disposed within said fourth chamber to provide a spring active on said floating piston therein with sufficient pressure to keep the hydraulic fluid in said third chamber in intimate contact with said valve means during axial movements of said primary piston to reduce shock absorber lag and thereby improve damping performance of said shock absorber.

5. A suspension strut and hydraulic shock absorber for a vehicle suspension telescopically movable in rebound and compression strokes comprising a cylinder tube having a hydraulic fluid therein, a piston mounted for reciprocating axial movement in said cylinder tube and cooperating with said cylinder tube for forming first and second chambers filled with hydraulic fluid, said piston having fluid valving means operative to control the passage of fluid between said first and second chambers as the piston axially moves therein, a reservoir for said hydraulic fluid, a piston rod operatively secured to said piston and axially extending in said cylinder tube and outwardly from one end thereof, said valving means comprising a first variable orifice valve means in said piston hydraulically connecting said first and second chambers and further comprising a second variable orifice valve means in said piston hydraulically connecting said second chamber to said reservoir, first deflectable disc valve means mounted on said piston and cooperating with the first variable orifice to meter flow between said first and second chambers only on the rebound stroke of said shock absorber, second deflectable disc valve means mounted on said piston to meter and control flow from said second chamber to said reservoir only on the compression stroke of said shock absorber, and first and second metering pin means having cam surfaces thereon respectively cooperating with said first and second deflectable disc valve means to control and increase the flow therethrough and reduce pressure build-up in said shock absorber under predetermined operating conditions.

* * * * *